(12) United States Patent
Viola et al.

(10) Patent No.: US 7,112,632 B2
(45) Date of Patent: Sep. 26, 2006

(54) PROCESS FOR THE PREPARATION OF LOW BRANCH CONTENT POLYBUTADIENE

(75) Inventors: Gian Tommaso Viola, Cervia (IT); Fabio Bacchelli, Ravenna (IT); Silvia Valenti, Ravenna (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 11/250,383

(22) Filed: Oct. 17, 2005

(65) Prior Publication Data
US 2006/0089472 A1    Apr. 27, 2006

(30) Foreign Application Priority Data
Oct. 25, 2004   (IT)   ................. MI2004A2022

(51) Int. Cl.
*C08F 8/08*   (2006.01)
*C08F 136/06*   (2006.01)

(52) U.S. Cl. .................. 525/193; 525/232; 525/237; 525/269; 525/285; 525/286; 525/302; 525/333.2; 526/164; 526/340.4; 524/572

(58) Field of Classification Search ................. 525/193, 525/232, 237, 269, 285, 286, 302, 333.2; 526/164, 340.4; 524/572
See application file for complete search history.

(56) References Cited

U.S. PATENT DOCUMENTS 4,990,573 A * 2/1991 Andreussi et al. ....... 525/332.3
5,567,784 A   10/1996 Wieder et al.
5,681,886 A * 10/1997 Fuchs et al. .............. 524/493
6,090,926 A   7/2000 Keyer et al.
2005/0182213 A1   8/2005 Viola et al.

FOREIGN PATENT DOCUMENTS

EP    0 957 115 A1    11/1999
EP    1 099 710 A1    5/2001

OTHER PUBLICATIONS

R. P. Quirk, et al., "Butadiene polymerization using neodymium versatate-based catalysts: catalyst optimization and effects of water and excess versatic acid", Polymer, Elsevier Science Publishers B.V, GB, vol. 41, No. 15, Jul. 2000, pp. 5903-5908.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process for the preparation of low branch content polybutadiene comprising:
(a) a first butadiene polymerisation stage;
(b) treatment of the polymer solution obtained upon completion of stage (a) with a coupling agent selected from:
 (i) polyunsaturated natural oils;
 (ii) butadiene and/or isoprene oligomers;
 (iii) butadiene and/or isoprene co-polymers with vinylarene monomers;
 the unsaturations present in compounds (i)–(iii) being at least partially substituted with groups selected from epoxides, anhydrides and esters;
(c) recovery of the low branch content polybutadiene obtained upon completion of stage (b).

23 Claims, 2 Drawing Sheets

PROCESS FOR THE PREPARATION OF LOW BRANCH CONTENT POLYBUTADIENE

The present invention relates to a process for the preparation of low branch content, highly cis polybutadiene. The polybutadiene thus obtained, displays an optimal balance between viscosity and elastic properties, which translates into a definite improvement in workability.

The present invention also describes sulphur vulcanisable mixtures, wherein the elastomeric component comprises the low branching content, highly cis polybutadiene, prepared according to the process of the present invention.

It is known that the introduction of branching into a linear polymeric structure conveys a series of applicational advantages, foremost among which being an improvement in workability.

The workability of an elastomeric material is a very important parameter in the transformation industry which adds various fillers to the rubber, foremost amongst which being reinforcing fillers (for example silica and carbon black), using closed mixing devices with defined internal geometries. When the user has the aim of maximising plant yield, it is necessary that the rheological characteristics of the material be such as to make incorporation of the filler possible in the shortest possible time.

Optimum distribution of the latter is demonstrated in the improved mechanical and dynamic characteristics of the vulcanised product. Filler dispersion is correlated with parameters which are measured using a variety of techniques; amongst which being electrical conductivity, in the case of carbon black mixtures, the Payne effect, or more practically, Mooney viscosity, before and after incorporation. Generally, aside from degradative phenomena, which should be avoided, the Mooney viscosity of the mixture is greater than that of the starting polymer, but the increase must be restrained.

The principal macromolecular parameters, on which it is possible to intervene in order to improve filler dispersion within the rubber, are molecular weight distribution and the presence of branched chains.

In absolutely general terms, globally applicable to rubbers and their processing, it should be emphasised that the introduction of a solid material into a rubbery matrix using machinery requires the necessary transfer of work from the machinery itself to the material through shear forces; hence it is necessary that the material responds in a viscoelastic manner in order to transfer such work from the volume area immediately adjacent to the mechanically active parts towards the inner areas, acting on the filler particles which must first be incorporated and then more homogeneously dispersed. It is a requisite that the polymeric material has sufficient elasticity in order to be able to perform the work transfer function from the machinery to the rubber, but an excess of this quality is not allowed since excessive elasticity would indeed make incorporation difficult: in this respect, the working of vulcanised rubber is considered impossible since it represents the conceptual reference of an (almost) purely elastic material.

Thus the objective to be pursued is the correct compromise between viscosity and elasticity: the attribute "correct" is used in purely qualitative terms since there is no satisfactory experimental basis for the identification of any qualitative correlation between the damping factors of the material and the shear applied in the mixer. By reducing the question to macromolecular terms, a material is required with sufficient elasticity, the latter property deriving from the appropriate macromolecular structure; in the case of a linear polymer, such as polybutadiene, synthesised using Nd and alkyl aluminium based catalytic systems, the elasticity required during processing is provided by the high molecular weight fractions. It is known that an excessively wide molecular weight distribution, i.e. containing both high molecular weight fractions (e.g. $>10^6$), and also those with low molecular weights (e.g. $<5.10^4$), is not suited to processing using traditional (short) mixing cycles in order to provide a vulcanised product with sufficiently good technological characteristics. The high molecular weight fraction, necessary for transmission of the work energy, is excessive, resulting in reduced process yield, in that the material has a tendency to break up, hence reducing the shear force, during the mixing stage. Thus, the high molecular weight fragments, whilst on the one hand favouring dispersion, on the other hand, necessitate a longer incorporation (wetting) stage, and consequently, increased mixing times.

Once the high molecular weight variable limits have been established in practice, it follows that it is not possible to eliminate such fraction without simultaneously eliminating the complimentary low molecular weight fraction: it should be remembered that the material has a reasonably symmetrical molecular weight distribution around a central molecular weight, and that its Mooney viscosity is typically equal to 40–50; hence it is obvious that with a wide molecular weight distribution, we would have both low and high molecular weights, where the former would act as plasticisers (viscous component) and the latter, as already mentioned, as elastic components. The reduction or elimination of the high and low molecular weight fractions, ideally bringing us towards a Poisson distribution, would give rise to a polymer without any internal plasticisers, hence during processing, displaying the behaviour defined in the art as "cheesy" or "dry" as a function of molecular weight; another negative characteristic of such material types is the appearance of the so-called "cold flow" phenomenon, in which the rubber bales have the tendency to flow during their typical storage times, and hence become deformed, making it impossible to use them in automated transformation line feeding systems.

The problem of obtaining a material with sufficient elasticity, but with the latter not deriving from the presence of high linear molecular weights, correlated with a wide molecular weight distribution (for example $M_w/M_n>3.5$), may be overcome by the introduction of a sufficient number of branches into the molecular chain.

Branching of a naturally linear polymer may only be achieved through a postmodification operation: herein, by the definition "naturally linear" is meant a macrostructure, the reference catalytic system of which being incapable of producing branches during kinetic chain propagation.

Aside from the techniques for introducing branches into a molecular chain, which we will see below, it is clear that, since we are dealing with a postmodification, the modifications must be made to a polymer having a suitable molecular architecture in order to achieve the goal of obtaining a processable material, from which to obtain a vulcanised rubber having good dynamic characteristics. In other words, to induce branching (and hence elasticity) into a high molecular weight distribution polymer (and hence already elastic due to the high molecular weight fractions) besides being useless, would become detrimental.

A method for achieving the aforementioned post-modification of polydienes is reported in U.S. Pat. No. 5,567,784, in which the polybutadiene is treated with a sulphur compound selected from $S_2Cl_2$, $SCl_2$, $SOCl_2$, preferably $S_2Cl_2$. This treatment is preceded by a stage where the reaction mixture is degassed, thus eliminating the low boiling point components from the reaction mixture, particularly, the unreacted diene monomers.

However, the aforementioned process has the drawback of introducing —S—S— bonds, which may break down during processing of the polydiene.

Finally, IT-MI 20040076 overcomes the problem by using a coupling agent selected from the peroxides. This technique is very efficient but has one drawback, in that, higher molecular weight chains are coupled preferentially. Thus the $M_w/M_n$ ratio is not reduced and the lower molecular weight fractions are still present.

A process overcoming the above mentioned drawbacks has now been found.

In accordance with that, the present invention relates to a process for the preparation of low branch content polybutadiene having the following characteristics:
- a branch index ($g_M$) value of less than 1, preferably from 0.92 to 0.99, even more preferably from 0.93 to 0.97;
- a damping coefficient (tan δ) value, defined as the trigonometric tangent of the ratio between the viscous modulus (G") and the elastic modulus (G') [tan δ=G"/G'] measured at 0.01 Hz, 100° C. and 1% strain, of from 0.80 to 1.40, preferably between 0.90 and 1.30;
- a Mooney viscosity of less than 49, preferably from 35 to 48, even more preferably from 39 to 46;
- an $M_w/M_n$ ratio of less than 2.5, preferably from 2.0 to 2.4, even more preferably from 2.1 to 2.2;
- a 1,4-cis unit percentage greater than 93%, preferably greater than 94%, even more preferably from 95% to 99%;

the aforementioned process comprises the following stages:

(a) polymerisation of the butadiene in the presence of organic solvents and in the presence of a catalytic system comprising (a1) a neodymium derivative selected from neodymium carboxylates, the aforesaid neodymium carboxylates being devoid of water and —COOH groups; (a2) an alkyl aluminium of general formula (Ia) $AlR^4_3$ or (Ib) $AlH_nR^4_{3-n}$ wherein "n" is from 1 to 2 and $R^4$, being either identical or differing from one another, represent an alkyl radical containing from 1 to 10 carbon atoms; (a3) an organo-aluminium derivative containing at least one halogen atom, preferably chlorine;

the aforesaid first stage giving rise to a linear polybutadiene ($g_M=1$) with a 1,4-cis unit content greater than 93%, and a $M_w/M_n$ ratio of less than 2.5, preferably from 2.0 to 2.4, even more preferably from 2.1 to 2.2;

(b) treatment of the polymer solution obtained upon completion of stage (a) with a coupling agent, thus obtaining low branch content polybutadiene having the above mentioned characteristics;

(c) recovery of the low branch content polybutadiene obtained upon completion of stage (b); aforementioned process being characterised in that the coupling agent is selected from:
(i) unsaturated natural oils, preferably belonging to the unsaturated fatty acid triglyceride class;
(ii) butadiene and/or isoprene oligomers;
(iii) butadiene and/or isoprene copolymers with vinylarene monomers, preferably butadiene-styrene copolymers;

the unsaturations present in compounds (i)–(iii) being at least partially substituted with groups selected from epoxides, anhydrides and esters, preferably from epoxides and succinic anhydride.

The $g_M$ parameter (see the experimental section for the definition thereof) is an index of the degree of linearity (or not) of the polybutadiene chain. A $g_M$ value equal to 1 is characteristic of a linear structure; values of less than 1 are typical of branched polymers. The lower the $g_M$ value, the greater the degree of branching of the polymer chain.

By the term "Mooney viscosity" is meant the viscosity of the polymer measured at 100° C. with rotor width (L) preheated for 1 minute and performing the measurement for 4 minutes in accordance with method ASTM D 1646.

Figure 1A:
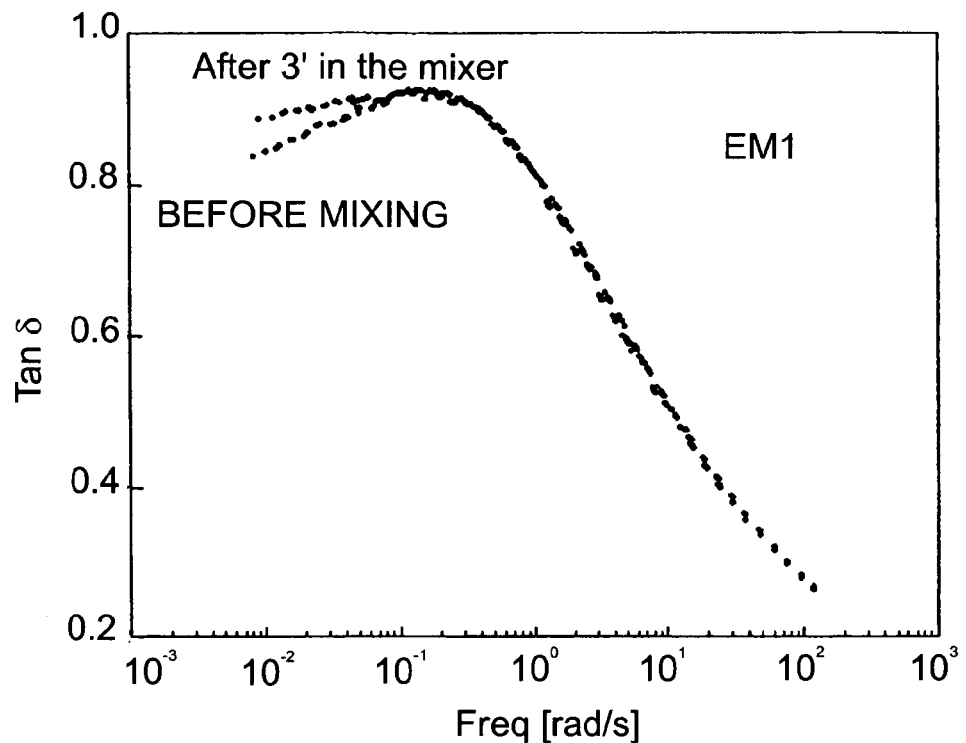
FIGS. 1a–1c are graphs of the damping coefficient value (tan δ) versus frequency [rad/s] of three vulcanized polybutadiene samples identified as EM1, BM1 and RIF respectively.

In stage (a) the butadiene is present in a concentration ranging from 5 to 40% by weight, preferably from 10 to 25% by weight. It is preferable to use distilled butadiene, optionally treated with molecular sieves and/or activated aluminium.

With reference to the neodymium carboxylates, in the preferred embodiments, they are selected from neodymium versatate, neodymium pivalate and neodymium 2-ethylhexanoate. Aside from the carboxylate type, it is important that the neodymium carboxylate be free, analytically speaking, from water derived impurities and free carboxyl groups. The neodymium carboxylate is used in quantities ranging from 0.1 to 10 mmol per 1,000 grams of butadiene to be polymerised. When the quantity is less than 0.1 mmol, the reaction rate is reduced to unacceptable values, whilst, when the quantity exceeds 10 mmol, the catalyst concentration is too high and the mean molecular weight of the resulting product is too low to be of use. Preferably, the neodymium carboxylate is used in quantities ranging from 0.5 to 5 mmol per 1,000 g of monomer.

With reference to the compounds (a2), or rather the aluminium alkyls of general formula (Ia) $AlR^4_3$ or (Ib) $AlH_nR^4_{3-n}$ wherein "n" is from 1 to 2, $R^4$ represents an alkyl radical containing from 1 to 10 carbon atoms, typical examples being trimethylaluminium, triethylaluminium, tri-n-propylaluminium, tri-isopropylaluminium, tri-n-butylaluminium, tri-iso-butylaluminium, tri-t-butylaluminium, tripentylaluminium, trihexylaluminium, tricyclohexylaluminium, trioctylaluminium, diethylaluminium hydride, di-n-propylaluminium hydride, di-n-butylaluminium hydride, di-isobutylaluminium hydride, dihexylaluminium hydride, di-isohexylaluminium hydride, dioctylaluminium hydride, di-iso-octylaluminium hydride, ethylaluminium dihydride, n-propylaluminium dihydride, isobutylaluminium dihydride. From among the above mentioned organo-aluminium compounds, triethylaluminium, tri-isobutylaluminium, diethylaluminium hydride and di-isobutylaluminium hydride are preferred.

With reference to the organo-aluminium derivatives containing at least one halogen atom (a3), these are preferably bromine or chlorine organo-aluminium derivatives, even more preferably aluminium organo chlorine derivatives. Typical examples of aluminium organo chlorine compounds are: diethyl aluminium chloride, ethylaluminium sesquichloride, ethyl aluminium dichloride, ethyl aluminium dibromide, ethylaluminium sesquichloride.

The ratio between the (a1) and (a2) components is usually between 1/0.5 and 1/30, preferably between 1/2 and 1/15.

The ratio between the (a1) and (a3) components is usually between 1/0.5 and 1/10, preferably between 1/1 and 1/5.

With reference to the solvent used in stage (a), this is selected from previously anhydrated inert organic solvents, such as saturated aliphatic hydrocarbons, for example butane, pentane, hexane, heptane; saturated alicyclic hydrocarbons, for example cyclopentane and cyclohexane; the monoolefins such as 1-butene and 2-butene; aromatic hydrocarbons, for example benzene, toluene, xylene. In a preferred embodiment, the solvent is selected from saturated aliphatic hydrocarbons. As already mentioned, the solvent must be as anhydrous as possible and devoid of any protogenic substances. Distillation followed by treatment over alumina beds and 3A and 4A molecular sieves is sufficient for obtaining a suitable solvent.

The reaction of stage (a) may be conducted under adiabatic or isothermal conditions. In any case, the temperature during stage (a) may vary from 20 to 120° C., preferably from 25 to 95° C.

Reaction times may vary depending on the operating conditions. Merely by way of example, during stage (a), complete conversion is obtained in 1–1.5 hours at a temperature of 60° C.; at higher temperatures the reaction rate increases and the conversions are completed in shorter times, for example within 30' at 80° C.

It should be observed that it is not necessary that, upon completion of stage (a) the conversion of the butadiene be pushed up to 99%; the limit is merely bound to the probable difficulties and inconvenience in handling an excessively low conversion. However, the catalytic systems used are very active and naturally provide conversion levels in excess of 98%.

Still during stage (a), the degree of polymerisation (and hence the number of "living" polymer chains present in the system) is regulated by acting on the relationship v=DDE/(Nd+Al/n). The quantity of Nd determines the rate of the reaction, and generally varies between 1 and 2.5 mmol/kg of monomer, and is selected depending on the preset working conditions; in the event that high reaction rates are required, then greater quantities of component (a1) will be used, possibly increasing the (a1)/(a2) ratio, whilst maintaining the (a1)/(a3) ratio within the range indicated. The "n" value depends on the temperature and is equal to approx. 3 for isothermal polymerisation reactions conducted at 60° C., down to a value of 1 for polymerisation reactions conducted at temperatures up to 100° C.

Still with reference to stage (a), in one preferred embodiment, the component (a1) is added as the last ingredient to the mixture of reagents. In the case of a batch reactor being used, then the measured amount of component (a1) is added to the mixture constituted by the solvent, monomer, component (a2) and component (a3).

In the case where the polymer is prepared in a continuous reactor, then component (a1) is preferably fed as close to the polymerisation reactor as possible, otherwise, even more preferably, within the polymerisation reactor itself.

Upon completion of stage (a) the polymer solution is treated (stage b) with the coupling agent.

In the preferred embodiment, the aforesaid coupling agent, dissolved in one or more of the hydrocarbons compatible with the polymerisation solvent, may be fed into the reaction mixture while emerging from stage (a). The temperature of stage (b) varies from 20° C. to 150° C., preferably from 70 to 120° C. The reaction between the outflow from stage (a) and the coupling agent occurs in very short, rapid times, usually less than 15 minutes.

It should be observed that the process of the present invention allows the feeding of the coupling agent into the, still active, polymer solution (stage b), without any prior deactivation of the same by using, for example, stearic acid as in patent application U.S. Pat. No. 5,567,784.

With reference to the coupling agent used in stage (b), it is preferably fed in a hydrocarbon solution, the aforementioned solution having been optionally treated, so as to reduce by as much as possible (or even eliminate) any water, air or substances capable of reacting with the organometallic compounds present in the polymer solution emerging from stage (a).

Typical examples of coupling agents used in the present invention are epoxidised seed oils, epoxidised polybutadienes, maleinised polybutadiene, and epoxidised or maleinised styrene-diene copolymers.

The seed oils are constituted by mono or polyunsaturated fatty acid triglycerides, the unsaturates obviously possibly being epoxidised or treated with maleic anhydride. Among the epoxidised seed oils particularly suited for use as coupling agents described in the present invention, are included those having considerable percentages of polyunsaturated fatty acids (>45%), particularly linoleic and α-linoleic acid.

To that end, soya bean oil, sunflower seed oil, linseed oil and cotton seed oil for example, are particularly suited.

The use of epoxidised soya bean oil (MW 974) marketed as Epoxo1R D65 by FACI S.p.a. (oxiranic oxygen content of 6.3%, equal to 3.8 epoxide groups/molecule) is reported in detail in the following experimental examples. Soya bean oil is a mixture of oleic acid (C18 having 1 unsaturated bond), linoleic acid (C18 having 2 unsaturated bonds), α-linoleic acid, palmitic and stearic acid (C16 and C18 respectively, both saturated) glycerol esters.

Butadiene or isoprene oligomers or co-polymers of such dienes with vinylarene compounds, particularly styrene, functionalised with epoxide or anhydride groups, may be likewise used as coupling agents.

The introduction of epoxide groups may occur directly during synthesis by performing the polymerisation of the dienes in the presence of hydrogen peroxide; under such conditions, the oligomers are characterised by terminal hydroxyl groups. The use of an epoxidised polybutadiene (MW 1350), with terminal hydroxyl groups, having 2.9 epoxide groups per chain, marketed under the name Poly bd® 600E by Sartomer, is reported in detail in the following experimental examples, As already mentioned, the coupling agent may also be selected from succinic anhydride containing resins, obtained by reacting with maleic anhydride. Particularly, such maleinised resins may contain from 2 to 11 succinic anhydride groups per molecule, the molecular weight of which being comprised of between 2000 and 15000, said resin being composed of polybutadiene, polyisoprene or co-polymers of said dienes or co-polymers with styrene. A non-limiting example of this type of material is constituted by Ricon® resin, marketed by Sartomer.

Particularly, the use of Ricon® 130MA8 (MW 2700) resin, constituted by polybutadiene, containing 2 succinic anhydride groups per chain, is reported in the examples.

In the preferred embodiment, compounds (i)–(iii) contain a number of functional groups, selected from those reported above, of at least 1.5, preferably from 2 to 6 per molecule.

Furthermore, it is preferable that the coupling agent usable during stage (b) of the process of the present invention be present in quantities varying from 0.1 to 0.6 equivalents, preferably from 0.2 to 0.4 equivalents, with respect to the number of polymer chains present in the system.

Stage (c) is constituted by the recovery of the lightly branched polybutadiene obtained upon completion of stage (b), preferably through an operation known as "flash"; the rapid reduction in pressure causes loss of the residual monomer and some of the solvent by evaporation, consequently increasing the polymer concentration in the solution: this operation is performed upon completion of stage (b) and occurs using conventional techniques; there then follows the quenching of the catalytic system using protic substances, for example water.

With respect to the process described in patent application U.S. Pat. No. 5,567,784, the process of the present invention allows the attainment of branched polybutadiene without the use of any sulphurated compounds.

The low branch content polybutadiene obtained according to the process of the present invention has such rheological characteristics as to optimise its behaviour during mixing with reinforcing fillers.

More particularly, certain polybutadienes obtained according to the process of the present invention are particularly interesting, in that they are capable of significantly reducing processing cycles, understood as being the addition of filler and subsequent extrusion processes. Hence, the aforementioned polybutadienes of the present invention are shown as being particularly useful as elastomeric components in vulcanisable mixtures.

Hence, the present invention also concerns sulphur-vulcanisable elastomeric mixtures containing polybutadienes having 1,4-cis unit content greater than 93%, preferably greater than 94%, even more preferably from 95% to 99%; the aforementioned polybutadiene being characterised by the following properties:

(x) a polydispersity index of from 2.0 to 2.3, preferably from 2.1 to 2.2;

(xi) a tan δ value of from 0.8 to 1.40, preferably from 0.90 to 1.30;

(xii) a $g_M$ value of from 0.92 to 0.99, preferably from 0.93 to 0.97;

(xiii) a Mooney viscosity of from 35 to 48, preferably from 39 to 46.

These parameters are determined according to methods described in the subsequent paragraph.

In the mixture of the present invention, the elastomeric component may be solely constituted by the above mentioned polybutadiene, or in part by the above mentioned polybutadiene and in part by other elastomers.

For example, the above mentioned polybutadiene may be mixed with natural rubber or with styrene-butadiene statistical co-polymers obtained through anionic or radical-based polymerisation in emulsion with styrene compositions up to 70%.

However, it is preferable that the elastomeric portion contain at least 60% of the low branch content polybutadiene of the present invention.

The mixtures of the present invention may be used in the preparation of automobile tyre treads, or for manufacturing the section of the tyre wall which comes into contact with the wheel rim; in the latter case, mixtures where the main, if not the sole, constituent is constituted by the polybutadiene of the present invention, together with a high reinforcing filler content, generally constituted by carbon black, are preferable.

As known to those skilled in the art, the aforesaid mixtures, for reasons of economy and/or practicability in subsequent processing, are usually mixed with reinforcing fillers (for example carbon black and silica) up to a maximum of 50% by weight, preferably, up to a maximum of 30% by weight, and/or plasticisers, aromatic or naphthene or paraffin oils, or paraffin waxes, up to a maximum of 60% by weight.

Hence, the mixtures of the present invention comprise, besides the elastomeric component, carbon black, mineral fillers, plasticisers, vulcanisation additives etc.

By way of example, with the total elastomeric component of the mixture forming the subject of the invention being considered equal to 100 parts, the remaining parts of the mixture are identified thus:

from 20 to 350 parts of carbon black, preferably between 50 and 200;

from 0 to 200 parts, preferably from 0 to 50 parts, of mineral filler, preferably selected from calcium carbonate, kaolin, silica and talc;

from 0 to 150 parts, preferably 25 to 90 parts of plasticiser; for example mineral oils of various compositions, partly aromatic, naphthenic and paraffinic and paraffin wax;

from 0 to 2 parts of process additive (co-adjuvant), with stearic acid and polyethylene glycol being preferred;

from 0 to 5 parts of antioxidant;

from 0 to 10 parts of zinc or lead oxide.

The carbon black used in the mixture may be of HAF, ISAF or SAF type and the like. More particularly, the carbon black should have an iodine absorption of no less than 60 mg/g and a dibutyl phthalate absorption of no less than 80 ml/100 grams.

Furthermore, vulcanising agents, well known to those skilled in the art and used for the vulcanisation of polybutadiene based mixtures, preferably sulphur, are used. The latter is used in quantities ranging from 0.1 to 3 parts by weight, preferably from 0.5 to 2 parts by weight per 100 parts of elastomeric composition.

Likewise vulcanisation accelerants, for example thiazole derived compounds, for example "M" (2-mercaptobenzothiazole), "CZ" (N-cyclohexyl-2 benzothiazyl sulphenamide), TBBS and N-tert-butyl-2-benzothiazole sulphenamide may be used. Such vulcanisation accelerants are normally present in quantities ranging from 0.1 to 5 parts by weight, preferably from 0.2 to 3 parts by weight with respect to the elastomeric composition.

Such vulcanising agents may be added both during the first mixing stage and, preferably, during the subsequent stage: however the choice of vulcanisation system and feeding methodology depend on the type of equipment and technology used during the mixing stage. The mixture of the present invention is obtained through mixing in a mixing machine, for example by using internal mixers (for example Brabander), then shaped and vulcanised.

The following examples are reported in order to aid the better understanding of the present invention. In the following experimental section, by the term post-modification is meant stage (b) of the process of the present invention, namely the reaction of the linear polybutadiene with the coupling agent.

EXAMPLES

Determination of the Water Content

Determination According to the Karl-Fischer Method

Determination of the —COOH groups Present in the Neodymium Carboxylate

Determination by I.R. Spectroscopy

Characterisation of the Polymers

The following analytical determinations are normally performed on the polymers:

Mooney viscosity, according to method ASTM D 1646 IR analysis of the microstructure (cis content)

The method is based on the calculation of the ratio between the intensity of the bands attributable to the 1,4-trans and 1,2-vinyl isomers and a reference band (internal standard) falling at 1312 cm-1 (L. J. Bellamy, The Infrared Spectra of Complex Molecules, Vol. 1 Third Edition, Chapman and Hall). The 1,4-cis content is determined by the difference from 100. Sample preparation is performed on a polybutadiene film, obtained by starting from a solution, evaporated on a KBr window.

Determination of the molecular weight distribution (MWD), according to the method currently in use via SEC—size exclusion chromatography—(GPC) in Tetrahydrofuran at T=25° C., using a PL-MIXED A (×4) column and molecular weight determination according to the Universal Calibration method (k=0.000457 dl/g and α=0.693).

Determination of the mean molecular weight and measurement of the degree of branching by the SEC/MALLS technique according to an internal method taken from the work described in Application Note, No. 9, Wyatt Technology and Pavel Kratochvil, Classical Light Scattering from Polymer Solutions, Polymer Science Library, 5, Elsevier Science Publishers B.V. 1987. By coupling a multi-angle laser light scattering detector (MALLS) with a traditional SEC/RI (size exclusion chromatography with refractive index detection) elution system, it is possible to simultaneously and absolutely measure the molecular weight and the radius of gyration of the macromolecules being separated in the chromatographic system; indeed, the quantity of light diffused by a macromolecular species in solution may be used directly in order to obtain its molecular weight, whilst the angular variation of the scattering is directly correlated with the mean dimensions of the molecule in solution. The basic equation used is the following:

$$\frac{k \cdot C}{R_\theta} = \frac{1}{M_w P_\theta} + 2A_2 c \qquad 1)$$

wherein:

K*=optical constant, which depends on the wavelength of the light used, on the polymer do/dc and on the solvent used $M_w$=weight averaged molecular weight c=concentration of the polymer solution $R_\theta$=intensity of the diffused light measured at an angle θ.

$P_\theta$=function describing the angular variation of the diffused light $A_2$=second viriale coefficient of the solvent, equal to 1 for an angle θ equal to 0, For very low concentrations (typical of an SEC system), equation 1 is reduced to $$\frac{k*C}{R_\theta} = \frac{1}{M_w P_\theta} \qquad 2)$$

and by performing the measurement at a number of angles, the extrapolation to the null angle of the function $K*c/R_\theta$ as a function of $sen^2\theta/2$ gives the molecular weight directly from the intercept value and the radius of gyration from the slope.

Furthermore, given that this measurement is performed for each "slice" of the chromatogram, it is possible to obtain a distribution of both the molecular weight and the radius of gyration.

The macromolecular dimensions in solution are directly correlated with their degree of branching: at an equal molecular weight, the smaller the dimensions of the macromolecule with respect to the corresponding linear molecule, then the higher the degree of branching; information relating to the macrostructure of a polymer is quantitatively deduced by evaluating the index of branching $g_M$, defined for each macromolecule, as the ratio of the quadratic mean gyration radius of the branched macromolecule and that of the linear macromolecule, for an equal molecular weight:

$$g_{MI} = \left[\frac{<r^1>?}{<r^2>_1}\right]_{M_1} \qquad 3)$$

The mean index of branching gm represents the mean of such ratio as a function of the distribution of the molecular masses, and is comprised of between 0 and 1.

Determination of the Viscoelastic Characteristics of the Linear and Modified Polymers.

Linear polymers (A, B, C, D, E), prepared solely in accordance with the first stage of the process of the present invention, and the corresponding branched polymers, obtained according to the process of the present invention (AM1, AM2, AM3, BM1, BM2, BM3, CM1, CM2, CM3, DM1, DM2, DM3, EM1, EM2, EM3), are characterised by dynamic-mechanical analysis by measuring the damping factor, namely tan δ at 0.01 Hz, 100° C. and 1% strain.

Measurement of tan δ allows evaluation of the combined effect of the molecular weight distribution and the presence of branching: low tan δ values (<1) are typical of a polymer with higher elastic characteristics than those of a polymer with tan δ>1. The contribution of high molecular weights (see polymers A, AM1, AM2, AM3) results in good elasticity, deleterious however for a rapid filler wetting stage: elimination of the high molecular weights (see polymers B,C,D,E) encourages faster wetting, but not the dispersion efficiency: at equal molecular weights, the introduction of branching (polymers BM1, BM2, BM3, CM1, CM2, CM3, DM1, DM2, DM3, EM1, EM2, EM3), provides elasticity (increases G', reduces tan δ), thus promoting dispersion of the carbon black.

Characterisation of the Mixtures

The mixtures are characterised as follows:

Measurement of Mooney viscosity according to ASTM D 1646 (the mean of three measurements is reported).

Calculation of Δ Mooney of the mixture: the difference between the Mooney viscosity of the polymer as it is and that of the mixture is calculated (the table reports the mean of three measurements).

Dynamic-mechanical determination of the mixture elastic modulus: G' at 1 Hz, 100° C. and 1% strain (the mean of three measurements is reported).

Taken overall, the above parameters give a valid indication of the incorporation rate and the degree of dispersion of the filler within the polymer matrix.

Neodymium Versatate Used in the Preparation of the Polymers.

Polymer synthesis is performed using five types of Nd-carboxylate, particularly three types of Nd-versatate: $NdV_31$, $NdV_32$ and $NdV_33$, characterised by the presence of different amounts of water and free versatic acid, one Nd-pivalate, $NdL_34$, and one Nd-2-ethyl-hexanoate $NdL_35$. Particularly:

|         | RCOOH/Nd (mol/mol) | H₂O/Nd (mol/mol) |
|---------|--------------------|------------------|
| $NdV_31$ | 2                  | 1                |
| $NdV_32$ | 0.3                | 0.05             |
| $NdV_33$ | 0                  | 0                |
| $NdV_34$ | 0                  | 0                |
| $NdV_35$ | 0                  | 0                |

$NdV_31$ has been prepared by reacting $Nd_2O_3$ and versatic acid in the presence of HCl in a hydrocarbon solvent at boiling point, with partial elimination of the water by distillation upon completion of the reaction;

$NdV_32$ has been prepared by following the instructions in patent application U.S. Pat. No. 6,090,926;

$NdV_33$ has been prepared by drying an aliquot of sample $NdV_32$ under high vacuum at 60° C. so as to eliminate the versatic acid and the water;

$NdL_34$ and $NdL_35$ have been prepared by following the instructions of the above mentioned patent application U.S. Pat. No. 6,090,926, using pyvalic acid and 2-ethyl-hexanoic acid respectively in place of the versatic acid, and drying the samples thus obtained under high vacuum so as to eliminate the acids and water.

EXAMPLES

Synthesis of Polybutadienes A–E

Tables 1 and 2 report the preparation conditions and the relevant characteristics, respectively, of the polybutadienes.

Comparative Example 1

Synthesis of Polymer A in the Presence of $NdV_31$ Catalyst 50 kg of an anhydrous hydrocarbon solvent, constituted by a mixture of hexanes, are fed into a 100 liter reactor, equipped with a mixer and cooling system, and brought to a temperature of 60° C. To the solvent are added in order: 6000 g of anhydrous butadiene, Nd versatate type $NdV_31$ solution in hydrocarbon solvent, corresponding to 2.8 mmol of Nd per 1,000 g of butadiene, DIBAH in an 8 fold molar excess over Nd and, finally, DEAL in a 3 fold molar excess over Nd. After 90', the reaction is considered completed, and from a sample of approx. 10 liters, extracted from the reactor, conversion is evaluated at 98%; from this aliquot of polymer solution, after the addition of phenolic antioxidant (Irganox® 1520, at a final concentration of 0.06% by weight in relation to the polymer) the solvent is then removed by the injection of steam. The coagulate is firstly dried by cold pressing, and drying is subsequently completed in a rolling press at 80° C.

The $M_W$ value, measured by GPC (gel permeation chromatography), has a value of 380,000, whilst the dispersion index $M_w/M_n$ measured by GPC is equal to 3.8. According to MALLS analysis, the polymer is linear (gn1=1), the cis content is 97% and the Mooney viscosity equal to 35.

The polymer solution remaining in the synthesis reactor is treated with various coupling agents in accordance with the details reported in examples 6, 7 and 8.

Comparative Example 2

Synthesis of Polymer B in the Presence of $NdV_32$ Catalyst

Under the same conditions reported for example 1, the quantity of Nd versatate type $NdV_32$ is reduced to 2.5 mmol per 1,000 g of butadiene, in addition to the DIBAH/Nd ratio, which is adjusted to 3.6 and the DEAC/Nd ratio, which is adjusted to 2.6. The reaction rate is increased so that the practically complete conversion, measured on a 10 liter aliquot of polymer solution (99.5%), is achieved within 60'. To this solution is added 0.06% by weight, in relation to the polymer, Irganox® 1520; and the solvent is eliminated in the same manner as for example 1. Analysis of the polymer shows some differences with respect to the polymer in example 1. Particularly, the $M_w$ by GPC is equal to 350,000 and the dispersion index is equal to 2.6.

The polymer solution remaining in the synthesis reactor is treated with various coupling agents in accordance with the details reported in examples 9, 10 and 11.

Example 3

Synthesis of Polymer C in the Presence of $NdV_33$ Catalyst

Under the same conditions as reported for example 2 and with the same quantities of reagents, however using a solid type $NdV_33$ Nd versatate, a polymer is prepared having the characteristics reported in table 2. The neodymium versatate NdV33 is fed into the reaction by precisely weighing out the quantity of solid to be fed into a phial, which is then subsequently broken directly inside the reactor.

Also in this case, the conversion, measured in a 10 liter aliquot of polymer solution withdrawn from the synthesis reactor, is practically completed after 60' (99%). This way, after the addition of 0.06% by weight of Irganox® 1520, polymer C is recovered (for its characterisation, see table 2).

The polymer solution remaining in the synthesis reactor is treated with various coupling agents in accordance with the details reported in examples 12, 13 and 14.

Example 4

Synthesis of Polymer D in the Presence of $NdL_34$ Catalyst

Under the same conditions reported for example 2 and with the quantities of reagents reported in Table 1 (2.6 mmol of Nd/kg of butadiene, DIBAH/Nd molar ratio equal to 3.6 and DEAC/Nd molar ratio equal to 2.7) however using a solid $NdL_34$ type Nd pivalate, a polymer is prepared having the characteristics reported in Table 2. The neodymium pivalate $NdL_34$ is fed into the reaction by precisely weighing out the quantity of solid to be fed into a vial, which is then subsequently broken directly inside the reactor.

Also in this case, the conversion, measured in a 10 liter aliquot of polymer solution withdrawn from the synthesis reactor, is practically completed after 60' (99%). Following the addition of 0.06% by weight of Irganox® 1520, polymer D is recovered.

The polymer solution remaining in the synthesis reactor is treated with various coupling agents in accordance with the details reported in examples 15, 16 and 17.

Example 5

Synthesis of Polymer E in the Presence of $NdL_35$ Catalyst

Under the same conditions reported for example 2 and with the quantities of reagents reported in Table 1 (2.4 mmol of Nd/kg of butadiene, DIBAH/Nd molar ratio equal to 3.7 and DEAC/Nd molar ratio equal to 2.4) however using a solid $NdL_35$ type Nd 2-ethyl-hexanoate, a polymer is prepared having the characteristics reported in Table 2.

The neodymium 2-ethyl-haxanoate $NdL_35$ is fed into the reaction by precisely weighing out the quantity of solid to be fed into a vial, which is then subsequently broken directly inside the reactor.

Also in this case, the conversion, measured in a 10 liter aliquot of polymer solution withdrawn from the synthesis reactor, is practically completed after 60' (99%). Following the addition of 006% by weight of Irganox® 1520, polymer E is recovered.

The polymer solution remaining in the synthesis reactor is treated with various coupling agents in accordance with the details reported in examples 18, 19 and 20.

Examples 6–20b

Postmodification of the Polybutadienes

The following examples refer to postmodification of polymers A–E (stage b of the process of the present invention) and the recovery of the polybutadienes thus modified (stage c of the process).

The aforesaid postmodification is performed by adding a hydrocarbon solvent solution of an organic substance (MW 900–15,000) functionalised with epoxide or carbonyl groups (succinic anhydride) to the polymer solution, under such conditions that the catalytic system and the chain terminals are still active and, in any case, the polymer solution has not come into contact with water, air or any substances capable of reacting with the organometallic compounds contained therein.

The use of epoxidised soya bean oil (MW 974) marketed as Epoxol® D65 by FACI S.p.a. (oxiranic oxygen content of 6.3%, equal to 3.8 epoxide groups/molecule) is reported in detail in the examples. Soya bean oil is a mixture of fatty acid esters, such as oleic, linoleic, α-linoleic, palmitic and stearic acid, with glycerol.

Use of an epoxidised polybutadiene (MW 1350), with terminal hydroxyl groups, having 3 epoxide groups per chain, marketed under the name Poly bd® 600E by Sartomer, is reported in the examples.

Finally, the use of Ricon® 130MA8 (MW 2700) resin, constituted by polybutadiene, containing 2 succinic anhydride groups per chain, is reported.

Comparative Example 6

Postmodification of Polymer (a) to Give the Postmodified Polymer AM1

A 10 liter aliquot of polymer solution, obtained upon completion of the reaction carried out according to the methods described in example 1, is transferred into a separate 20 liter reactor and treated at a temperature of 90° C., reached by the polymer solution upon completion of the reaction along with a 1% solution of epoxidised soya bean oil Epoxol® D65 (0.25 g of Epoxol® D65/1,000 g of butadiene) in hexane. After 10', the reaction is complete and upon emerging from said postmodification reactor, the solution is treated with water in a mixer in order to destroy any excess organometallic compounds constituting the residue of the catalytic system. This is followed by addition of the primary (Irganox® 565) and secondary (TNPP) antioxidants, 0.15 and 0.50% by weight over the rubber, respectively.

Following elimination of the solvent by the addition of steam at 105° C., the separation of the wet lumps and their subsequent complete drying in a press, the polymer has a Mooney viscosity equal to 45 (Polymer AM1). The molecular characteristics are reported in tables 3 and 4.

Comparative Example 7

Postmodification of Polymer (A) to Give the Postmodified Polymer AM2

A 10 liter aliquot of polymer solution, obtained upon completion of the reaction carried out according to the methods described in example 1, is transferred into a separate 20 liter reactor and treated to a temperature of 90° C., reached by the polymer solution upon completion of the reaction, along with a 2.5% solution of epoxidised polybutadiene Poly bd® 600E (1 g of Poly bd® 600E/1,000 g of butadiene) in mesitylene. After 10 minutes, the reaction is complete and upon emerging from said postmodification reactor, the solution is treated with water in a mixer in order to destroy any excess organometallic compounds constituting the residue of the catalytic system. This is followed by addition of the primary (Irganox® 565) and secondary (TNPP) antioxidants, 0.15 and 0.50% by weight over the rubber, respectively.

Following elimination of the solvent by the addition of steam at 105° C., the separation of the wet lumps and their subsequent complete drying in a press, the polymer has a Mooney viscosity equal to 44 (Polymer AM2). The molecular characteristics are reported in tables 3 and 4.

Comparative Example 8

Postmodification of Polymer (A) to Give the Postmodified Polymer AM3

A 10 liter aliquot of polymer solution, obtained upon completion of the reaction carried out according to the methods described in example 1, is transferred into a separate 20 liter reactor and treated to a temperature of 90° C., reached by the polymer solution upon completion of the reaction, along with a 4% solution of maleinised polybutadiene Ricon® 130MA8 (1.2 g of Ricon® 130MA8/1,000 g of butadiene) in hexane. After 10 minutes, the reaction is complete and upon emerging from said postmodification reactor, the solution is treated with water in a mixer in order to destroy any excess organometallic compounds constituting the residue of the catalytic system. This is followed by addition of the primary (Irganox® 565) and secondary (TNPP) antioxidants, 0.15 and 0.50% by weight over the rubber, respectively.

Following elimination of the solvent by the addition of steam at 105° C., the separation of the wet lumps and their subsequent complete drying in a press, the polymer has a Mooney viscosity equal to 44 (Polymer AM2). The molecular characteristics are reported in tables 3 and 4.

Comparative Example 9

Postmodification of Polymer B to Give the Postmodified Polymer BM1

A 10 liter aliquot of polymer solution, obtained upon completion of the reaction carried out according to the methods described in example 2 is transferred into a separate 20 liter reactor, where, at a temperature of 90° C., reached by the polymer solution upon completion of the reaction, is added a 1% solution of epoxidised soya bean oil Epoxol® D65 in a mixture of hexanes. The ratio of epoxidised oil to starting butadiene is 0.2 g/1,000 g of butadiene. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 46 (Polymer BM1). The molecular characteristics are reported in tables 3 and 4.

Comparative Example 10

Postmodification of Polymer B to Give the Postmodified Polymer BM2

A 10 liter aliquot of polymer solution, obtained upon completion of the reaction carried out according to the methods described in example 2 is transferred into a separate 20 liter reactor, where, at a temperature of 90° C., reached by the polymer solution upon completion of the reaction, is added a 2.5% solution of epoxidised polybutadiene Poly bd® 600E 1.1 g/1'000 g of polybutadiene) in a mesitylene. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer BM2). The molecular characteristics are reported in tables 3 and 4.

Comparative Example 11

Postmodification of Polymer B to Give the Postmodified Polymer BM3

A 10 liter aliquot of polymer solution, obtained upon completion of the reaction carried out according to the methods described in example 2 is transferred into a separate 20 liter reactor, where, at a temperature of 90° C., reached by the polymer solution upon completion of the reaction, is added a 4% solution of maleinised polybutadiene Ricon® 130MA8 (1.3 g/1,000 g of butadiene) in a mixture of hexanes.

After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer BM3). The molecular characteristics are reported in tables 3 and 4.

Example 12

Postmodification of Polymer C to Give the Postmodified Polymer CM1

A 10 liter aliquot of polymer solution, obtained upon completion of the reaction carried out according to the methods described in example 3 is transferred into a separate 20 liter reactor, where, at a temperature of 90° C., reached by the polymer solution upon completion of the reaction, is added a 1% solution of epoxidised soya bean oil Epoxol® D65 (0.2 g/1,000 g of butadiene) in a mixture of hexanes. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer CM1). The molecular characteristics are reported in tables 3 and 4.

Example 13

Postmodification of Polymer C to Give the Postmodified Polymer CM2

A 10 liter aliquot of polymer solution, obtained upon completion of the reaction carried out according to the methods described in example 3 is transferred into a separate 20 liter reactor, where, at a temperature of 90° C., reached by the polymer solution upon completion of the reaction, is added a 2.5% solution of epoxidised polybutadiene Poly bd® 600E (0.9 g/1,000 g) in mesitylene. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 46 (Polymer CM2). The molecular characteristics are reported in tables 3 and 4.

Example 14

Postmodification of Polymer C to Give the Postmodified Polymer CM3

A 10 liter aliquot of polymer solution, obtained upon completion of the reaction carried out according to the methods described in example 3 is transferred into a separate 20 liter reactor, where, at a temperature of 90° C., reached by the polymer solution upon completion of the reaction is added a 4% solution of maleinised polybutadiene Ricon® 130MA8 (1.2 g/1,000 g of butadiene) in a mixture of hexanes.

After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 43 (Polymer CM3). The molecular characteristics are reported in tables 3 and 4.

Example 15

Postmodification of Polymer D to Give the Postmodified Polymer DM1

A 10 liter aliquot of polymer solution, obtained upon completion of the reaction carried out according to the methods described in example 4 is transferred into a separate 20 liter reactor, where, at a temperature of 90° C., reached by the polymer solution upon completion of the reaction, is added a 1% solution of epoxidised soya bean oil Epoxol® D65 (0.25 g/1,000 g of butadiene) in a mixture of hexanes. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 44 (Polymer DM1). The molecular characteristics are reported in tables 3 and 4.

Example 16

Postmodification of Polymer D to Give the Postmodified Polymer DM2

A 10 liter aliquot of polymer solution, obtained upon completion of the reaction carried out according to the methods described in example 4 is transferred into a separate 20 liter reactor, where, at a temperature of 90° C., reached by the polymer solution upon completion of the reaction, is added a 2.5% solution of epoxidised polybutadiene Poly bd® 600E (1 g/1,000 g of butadiene) in mesitylene. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer DM2). The molecular characteristics are reported in tables 3 and 4.

Example 17

Postmodification of Polymer D to Give the Postmodified Polymer DM3

A 10 liter aliquot of polymer solution, obtained upon completion of the reaction carried out according to the methods described in example 4 is transferred into a separate 20 liter reactor, where, at a temperature of 90° C., reached by the polymer solution upon completion of the reaction, is added a 4% solution of maleinised polybutadiene Ricon® 130MA8 (1.3 g/1.000 g of butadiene) in a mixture of hexanes. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer DM3). The molecular characteristics are reported in tables 3 and 4.

Example 18

Postmodification of Polymer E to Give the Postmodified Polymer EM1

A 10 liter aliquot of polymer solution, obtained upon completion of the reaction carried out according to the methods described in example 5 is transferred into a separate 20 liter reactor, where, at a temperature of 90° C., reached by the polymer solution upon completion of the reaction, is added a 1% solution of epoxidised soya bean oil Epoxol® D65 (0.2 g/1,000 g of butadiene) in a mixture of hexanes. After 10 minutes the reaction is complete and upon emerging from said postmodification reactor the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 46 (Polymer EM1). The molecular characteristics are reported in tables 3 and 4.

Example 19

Postmodification of Polymer E to Give the Postmodified Polymer EM2

A 10 liter of polymer solution, obtained upon completion of the reaction carried out according to the methods described in example 5 is transferred into a separate 20 liter reactor, where, at a temperature of 90° C., reached by the polymer solution upon completion of the reaction, is added a 2.5% solution of epoxidised polybutadiene Poly bd® 600E (0.9 g/1.000 g of butadiene) in mesitylene. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer EM2). The molecular characteristics are reported in tables 3 and 4.

Example 20

Postmodification of Polymer E to Give the Postmodified Polymer EM3

A 10 liter of polymer solution, obtained upon completion of the reaction carried out according to the methods described in example 5 is transferred into a separate 20 liter reactor, where, at a temperature of 90° C., reached by the polymer solution upon completion of the reaction, is added a 4% solution of maleinised polybutadiene Ricon® 130MA8 (1.2 g/1.000 g of butadiene) in a mixture of hexanes. After 10 minutes the reaction is complete and upon emerging from said postmodification reactor, the solution is treated with water in a mixer in order to destroy any excess organometallic compounds constituting the residue from the catalytic system. This is followed by addition of the primary (Irganox® 565) and secondary (TNPP) antioxidants, 0.15 and 0.50% by weight over the rubber, respectively. Following elimination of the solvent by the addition of steam at 105° C., the separation of the wet lumps and their subsequent complete drying in a press, the polymer has a Mooney viscosity equal to 45 (Polymer EM3). The molecular characteristics are reported in tables 3 and 4.

TABLE 1

Polymerisation conditions

| Polymer | T (° C.) | Time (') | Nd-type | Nd* | DIBAH/Nd** | DEAC/Nd*** |
|---|---|---|---|---|---|---|
| A comp | 60 | 90 | $NdV_31$ | 2.8 | 8 | 3 |
| B | 60 | 60 | $NdV_32$ | 2.5 | 3.6 | 2.6 |
| C | 60 | 60 | $NdV_33$ | 2.5 | 3.6 | 2.6 |
| D | 60 | 60 | $NdV_34$ | 2.6 | 3.6 | 2.7 |
| E | 60 | 60 | $NdV_35$ | 2.4 | 3.7 | 2.4 |

*mmol Nd/1,000 g butadiene
**mol/mol
***mol/mol

TABLE 2

Characterisation of non-modified polybutadienes (obtained upon completion of stage a)

| Polymer | $M_w$ SEC | $M_w$ MALLS | $M_w/M_n$ SEC | $g_M$ MALLS | cis % | ML |
|---|---|---|---|---|---|---|
| A comp | 380,000 | 402,000 | 3.8 | 1 | 97 | 35 |
| B comp | 350,000 | 360,000 | 2.6 | 1 | 96 | 35 |
| C | 320,000 | 341,000 | 2.2 | 1 | 94 | 34 |
| D | 308,000 | 328,000 | 2.2 | 1 | 95 | 33 |
| E | 315,000 | 335,000 | 2.2 | 1 | 96 | 35 |

TABLE 3

Characterisation of postmodified polybutadienes (obtained upon completion of stages b–c)

| Modified polymer abbrev$^n$ | Polymer precursor | Coupling agent Type | Coupling agent quantity* | $M_w$ MALLS | $M_w/M_n$ SEC | ML |
|---|---|---|---|---|---|---|
| AM1 comp. | A comp. | Epoxol D65 | 0.25 | 430,000 | 3.7 | 45 |
| AM2 comp. | A comp. | Poly bd 600E | 1 | 420,000 | 3.7 | 44 |
| AM3 comp. | A comp. | Ricon 130MA8 | 1.2 | 422,000 | 3.7 | 45 |
| BM1 comp. | B comp. | Epoxol D65 | 0.20 | 385,000 | 2.5 | 46 |
| BM2 comp. | B comp. | Poly bd 600E | 1.1 | 380,000 | 2.5 | 45 |
| BM3 comp. | B comp. | Ricon 130MA8 | 1.3 | 377,000 | 2.5 | 45 |
| CM1 | C | Epoxol D65 | 0.20 | 367,000 | 2.1 | 45 |
| CM2 | C | Poly bd 600E | 0.9 | 360,000 | 2.1 | 46 |
| CM3 | C | Ricon 130MA8 | 1.2 | 358,000 | 2.1 | 43 |
| DM1 | D | Epoxol D65 | 0.25 | 353,000 | 2.1 | 44 |
| DM2 | D | Poly bd 600E | 1 | 350,000 | 2.1 | 45 |
| DM3 | D | Ricon 130MA8 | 1.3 | 348,000 | 2.1 | 45 |
| EM1 | E | Epoxol D65 | 0.20 | 358,000 | 2.1 | 46 |
| EM2 | E | Poly bd 600E | 0.9 | 355,000 | 2.1 | 45 |
| EM3 | E | Ricon 130MA8 | 1.2 | 352,000 | 2.1 | 45 |

*g of coupling agent/1,000 g of butadiene

TABLE 4

Characterisation of the polymers as they are and postmodified.

| Polymer | ML | $g_M$ | $M_w/M_n$ | tan δ |
|---------|-----|-------|-----------|-------|
| A comp. | 35 | 1 | 3.8 | 0.89 |
| AM1 comp. | 45 | 0.95 | 3.7 | 0.83 |
| AM2 comp. | 44 | 0.95 | 3.7 | 0.80 |
| AM3 comp. | 45 | 0.95 | 3.7 | 0.82 |
| B comp. | 34 | 1 | 2.6 | 1.33 |
| BM1 comp. | 46 | 0.95 | 2.5 | 0.91 |
| BM2 comp. | 45 | 0.95 | 2.5 | 0.92 |
| BM3 comp. | 45 | 0.95 | 2.5 | 0.91 |
| C comp. | 34 | 1 | 2.2 | 1.38 |
| CM1 | 45 | 0.96 | 2.1 | 0.98 |
| CM2 | 46 | 0.96 | 2.1 | 0.97 |
| CM3 | 43 | 0.97 | 2.1 | 1.10 |
| D comp. | 33 | 1 | 2.2 | 1.46 |
| DM1 | 44 | 0.97 | 2.1 | 1.02 |
| DM2 | 45 | 0.97 | 2.1 | 1.05 |
| DM3 | 45 | 0.98 | 2.1 | 1.08 |
| E comp. | 35 | 1 | 2.2 | 1.40 |
| EM1 | 46 | 0.96 | 2.1 | 0.96 |
| EM2 | 45 | 0.96 | 2.1 | 0.98 |
| EM3 | 45 | 0.97 | 2.1 | 1.00 |

Note to table 4: It should be underlined that the value for $g_M$ is directly correlated with the degree of branching introduced only if, as in this case, the postmodification process and, consequently the type of branching, are of the same type.

Commentary to Table 4

Measurement of tan δ allows evaluation of the combined effect of the molecular weight distribution and the presence of branching: lower tan δ values are typical of a polymer with greater elastic characteristics. The contribution of the high molecular weights (see polymer A) results in good elasticity, but is however deleterious for rapid filler incorporation (wetting). However, reduction in the high molecular weights (see polymers B,C,D,E) encourages faster wetting, but not the dispersion efficiency. Instead, the introduction of branching into the polymers of the present invention provides elasticity (reducing tan δ), aiding the dispersion of the filler during the preparation of the mixture.

In the case of the postmodified polymers of the present invention having $M_w/M_n$ values from 2.0 to 2.3, the narrow dispersion index interval allows the correlation of the tan δ value with greater or lesser degrees of branching. $g_M$ values of less than 1 (direct index of the presence of branching) follows this scheme only in cases of polymers which, having been prepared in the same manner, have the same type of branching and are only differentiated according to the quantity of the same.

Preparation of the Mixtures

The mixture formulations, the preparation conditions and the relevant characterisations are reported.

By way of comparison, a mixture has been prepared with a commercially available polybutadiene indicated by the letters RIF, the characteristics of which are reported in table 5:

TABLE 5

| | $M_w$ MALLS | $M_w/M_n$ (SEC) | $g_M$ | ML | % cis | Irganox 1520 (% by weight) |
|---|---|---|---|---|---|---|
| RIF | 397,000 | 2.6 | 0.85 | 46 | 96 | 0.06 |

The polymer RIF has been subjected to extraction (two aliquots extracted with methanol for 40 hours), for the complete elimination of the extractable components and, subsequently, subjected to X-ray Fluorescence analysis (XRF). The results obtained have been compared with those from the other two aliquots of polybutadiene as they are, i.e. not subjected to extraction.

The following results are obtained for the polymer as it is prior to extraction (the mean of two determinations):

| Element | [mg/kg] | [mmol/kg] |
|---------|---------|-----------|
| Al | 330 | 12.22 |
| Nd | 135 | 0.94 |
| S | 300 | 9.38 |
| Cl | 225 | 6.36 |

The polymer obtained following extraction revealed the following results on analysis:

| Element | [mg/kg] | [mmol/kg] |
|---------|---------|-----------|
| Al | 220 | 8.15 |
| Nd | 110 | 0.76 |
| S | 95 | 2.97 |
| Cl | 115 | 3.25 |

Hence, methanol extraction has removed part of the Cl and S containing compounds, particularly those not bound to the macromolecule. The portions of such elements which are still present in the extracted polymer, in that they are bound to the macromolecule, are basically in a unitary molar ratio, as expected from the presence of a group —CH(Cl)=CH—S—S—CH=CH(Cl)— deriving from the addition of $S_2Cl_2$ to a C=C double bond belonging to a polybutadiene polymeric chain [J. R. Shelton et al, Proceeding of International Rubber Conference, Washington, D.C. (1959)].

The formulation of the mixture used is reported in table 6.

TABLE 6

| Polybutadiene | 100 phr (parts per hundred parts) |
| Carbon black (N330) | 50 phr |
| MES oil | 10 phr |
| ZnO | 4 phr |
| 6PPD | 3 phr |
| Stearic acid | 3 phr |

By the initials 6PPD is meant N-(1,3-dimethylbutyl)-N'-phenyl p-phenylenediamine, marketed under the name Santoflex® 13.

The mixture is prepared in a Brabender internal mixer with Roller rotors, 350 cm³ chamber, 30 rpm. The initial temperature is 50° C., whilst mixing times are equal to 3' and 10'. The degree of dispersion of the filler and the rate with which it is dispersed are evaluated by combining the results of the Mooney viscosity and the elastic modulus G', measured within the mixer at 3' and 10' time points: an overly high Mooney value at 10 minutes corresponds to a mixture that is too difficult to process and for which 10 minutes of processing are still insufficient, whilst a small difference in Δ Mooney at 3 minutes and 10 minutes indicates a more rapid mixing process. In any case, better filler dispersion correlates with lower G' values at 10 minutes. The measurements, performed on mixtures prepared using various polybutadienes, are reported in table 7.

TABLE 7

| POLYMER | ΔMooney 3' | ΔMooney 10' | G' 10' kPa | Category* |
|---|---|---|---|---|
| A comp. | 35 | 25 | 360 | D |
| AM1 comp. | 40 | 30 | 370 | D |
| AM2 comp. | 39 | 31 | 370 | D |
| AM3 comp. | 41 | 30 | 365 | D |
| B comp. | 28 | 26 | 410 | C |
| BM1 comp. | 26 | 24 | 350 | A |
| BM2 comp. | 25 | 23 | 340 | A |
| BM3 comp. | 24 | 23 | 350 | A |
| C comp. | 28 | 27 | 390 | C |
| CM1 | 23 | 22 | 320 | E |
| CM2 | 23 | 21 | 290 | E |
| CM3 | 24 | 22 | 290 | E |
| D comp. | 29 | 27 | 370 | C |
| DM1 | 23 | 22 | 320 | E |
| DM2 | 23 | 21 | 280 | E |
| DM3 | 22 | 21 | 300 | E |
| E comp. | 30 | 29 | 380 | C |
| EM1 | 22 | 20 | 280 | E |
| EM2 | 20 | 19 | 260 | E |
| EM3 | 21 | 20 | 270 | E |
| RIF | 22 | 18 | 330 | — |

*Attributed according to different mixing behaviours (see commentary regarding the table)

Commentary to Table 7

Generally, it is possible to identify 5 distinct polymer categories according to mixing behaviour:
 a) fast wetting stage and optimal dispersion;
 b) slow wetting stage and optimal dispersion;
 c) fast wetting stage and unsatisfactory dispersion;
 d) slow wetting stage and unsatisfactory dispersion.
 e) wetting stage faster than category (a) and optimal dispersion.

Low branch content polymers with $M_w/M_n$ comprised of between 2.4 and 2.7 (for example polymers BM1, BM2, BM3) belong to category (a). Such polymers are characterised by tan δ values comprised of between 1.2 and 0.9 and $g_M$ from 0.95 to 0.99.

High branch content polymers with narrow molecular weight distributions, not exemplified in the experimental section, belong to category (b).

Linear polymers with narrow distributions (for example polymers B, C, D and E from table 5) with $M_w/M_n$ values of less than 2.7 belong to polymer category (c). Such polymers are characterised by tan δ values greater than 1.2 and, obviously, $g_M=1$.

Linear or branched polymers with wide molecular weight distributions (A, AM1, AM2, AM3) belong to category (d). Such polymers are characterised by tan δ values of less than 0.9 and $M_w/M_n$ greater than 2.7.

Materials characterised by $M_w/M_n<2.3$; $0.9<$tan δ$<1.2$; $0.9$ $g_m<0.99$ (polymers CM1, CM2, CM3, DM1, DM2, DM3 and EM1, EM2, EM3) belong to category (e).

Table 7 reports the Δ Mooney measurements for the mixtures obtained after 3 minutes and 10 minutes of mixing.

Category (e) is believed to be the most satisfactory by the transformation industry, since it combines brief processing cycles with optimal filler (and hence reinforcing) dispersion.

Vulcanisation of the Mixtures

The same protocol for the preparation of the previously described mixtures is used as the basis for producing vulcanised samples. The sulphur (vulcanising agent), in quantities of 1 phr, and an accelerant (TBBS, N-tert-butyl-2-benzothiazole sulphenamide), in quantities of 1 phr, are added to the prepared mixture after 3' and 10' in the Brabender mixer and mixed for a period of a further 3', still in a Brabender mixer. Vulcanisation is carried out in a press, at a temperature of 150° C., for 40 minutes.

A comparison between the characteristics of the vulcanised products prepared using mixtures classified according to the previously indicated categories, and the mixture obtained in the same manner by starting from reference polymer RIF, are reported below.

In particular, the polymers used are:
 1. BM1, BM2, BM3 for category a)
 2. EM1, EM2, EM3 for category e)
 3. B and C for category c)
 4. AM1, AM2, AM3 for category d)

The results are reported in table 8.

TABLE 8

| | Category | Rupture filler 10 minutes | Elongation to rupture 10 minutes | Tanδ 3 minutes** | Tanδ 10 minutes** |
|---|---|---|---|---|---|
| BM1 | a | 17.4 ± 0.9 | 510 | 0.145 | 0.146 |
| BM2 | a | 17.3 ± 0.9 | 500 | 0.143 | 0.144 |
| BM3 | a | 17.5 ± 0.9 | 510 | 0.144 | 0.145 |
| EM1 | e | 17.2 ± 0.9 | 510 | 0.142 | 0.142 |
| EM2 | e | 17.0 ± 0.8 | 520 | 0.143 | 0.143 |
| EM3 | e | 17.1 ± 0.9 | 520 | 0.144 | 0.143 |
| B | c | 16.6 ± 0.8 | 490 | 0.159 | 0.156 |
| C | c | 16.1 ± 0.8 | 480 | 0.158 | 0.155 |
| AM1 | d | 18.1 ± 0.9 | 530 | 0.158 | 0.146 |
| AM2 | d | 18.2 ± 0.9 | 520 | 0.159 | 0.146 |
| AM3 | d | 18.0 ± 0.9 | 530 | 0.158 | 0.145 |
| RIF | — | 17.8 ± 0.9 | 520 | 0.144 | 0.145 |

**time in the mixer

The tan δ measurements are performed on vulcanised products obtained by starting from the prepared mixtures at 3' and 10' time points in the mixer: this way, it is possible to measure the effect of the mixing cycle length on the final properties of the vulcanised product.

From observation of the data reported in Tab. 8, it is evident that polymers BM1, BM2, BM3 and EM1, EM2, EM3 and RIF have already reached optimal performance, in terms of tan δ, after 3', in contrast to polymers AM1–AM3 for which 10' are necessary (slower dispersion stage). The linear polymers B and C, which are lacking in terms of elastic component, are in any case not capable of equalling the performances of the others, even after 10 minutes of mixing.

Particularly, the polymers denominated EM1, EM2, EM3 characterised by having $M_w/M_n<2.3$ (category e) are the best in terms of incorporation rate (see Table 7) as well as having optimal filler dispersion (see Table 8). Polymers BM1, BM2, BM3 and EM1, EM2, EM3 display more or less constant tan δ values with increasing mixing time, in contrast to the reference polymer RIF; this may be explained by the different technique with which the branches were introduced, and hence correlated with the thermo-mechanical stability of the material, whilst maintaining the substantial equivalency of the antioxidant system.

The curves of tan δ against frequency at 60° C. and 0.1% strain have been recorded for polymers BM1, EM1 and RIF worked for 3' in a Brabender in the absence of any additives, with the exception of an aforementioned antioxidant, of the same type and in the same quantity for each.

Figure 1B:
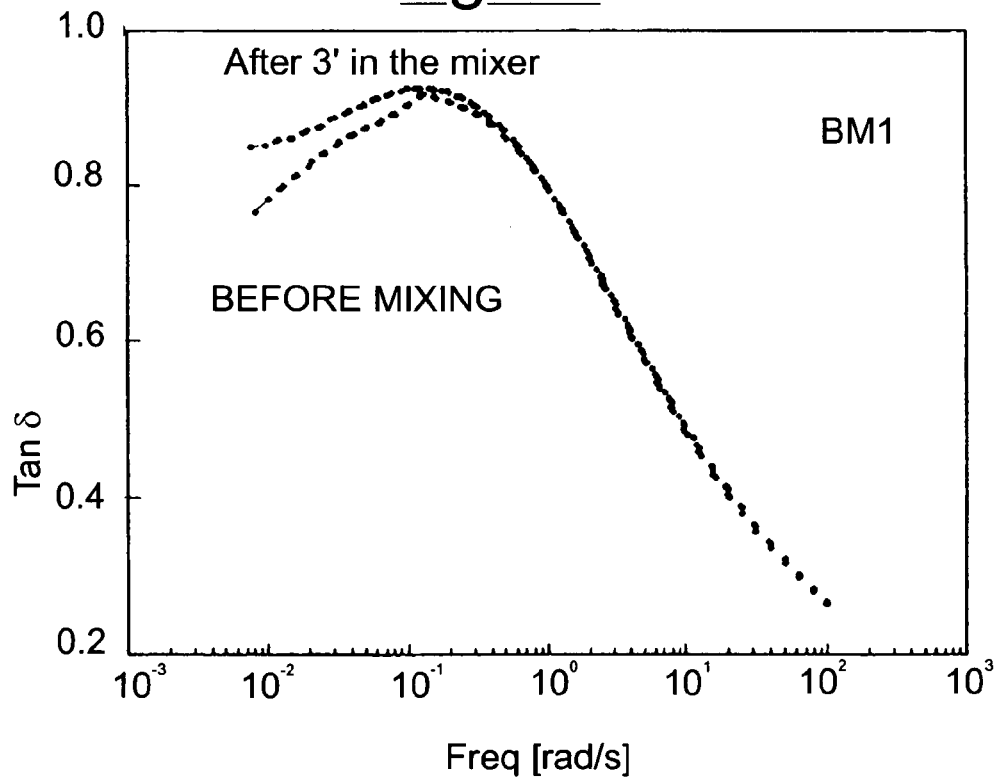
Figure 1C:
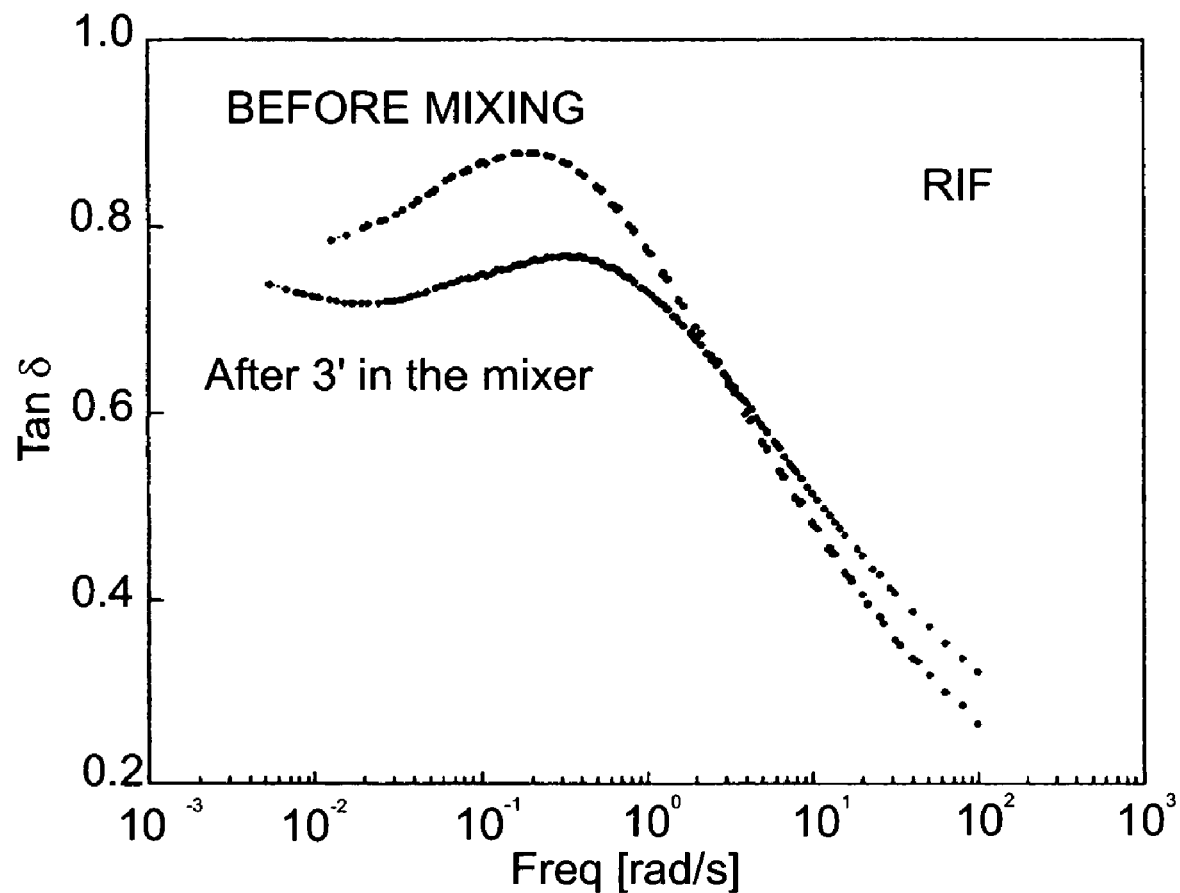

Whilst polymers BM1 and EM1 (FIGS. 1a–1b) are practically unaltered, the polymer RIF (FIG. 1c) shows variation in the value of tan δ in almost all frequency fields investigated: this variation may be attributed to alterations in molecular weight distribution and branching, as evidenced in FIG. 1 and from the analyses reported in tab. 9.

In this case, polymer EM1 shows greater stability even with respect to BM1.

TABLE 9

|  | $M_w$ (MALLS) | $M_w/M_n$ (SEC) |
| --- | --- | --- |
| BM1 | 385,000 | 2.5 |
| EM1 | 358,000 | 2.1 |
| RIF | 397,000 | 2.6 |

The invention claimed is:

1. A process for the preparation of low branch content polybutadiene having the following characteristics:
a branch index value ($g_M$) of less than 1;
a damping coefficient (tan δ) value, defined as the trigonometric tangent of the ratio between the viscous modulus (G″) and the elastic modulus (G′) [tan δ=G″/G′] measured at 0.01 Hz, 100° C. and 1% strain, from 0.80 to 1.40;
a Mooney viscosity of less than 49;
$M_w/M_n$ less than 2.5;
a 1,4-cis unit percentage greater than 93%;
the aforementioned process comprising the following stages:
(a) polymerisation of the butadiene in the presence of organic solvents and in the presence of a catalytic system comprising (a1) a neodymium derivative selected from neodymium carboxylates, the aforesaid neodymium carboxylates being devoid of water and —COOH groups; (a2) an aluminium alkyl of general formula (Ia) $AlR^4_3$ or (Ib) $AlH_nR^4_{3-n}$ wherein "n" is from 1 to 2 and $R^4$, being either identical or differing from one another, represent an alkyl radical containing from 1 to 10 carbon atoms; (a3) an organo-aluminium derivative containing at least one halogen atom;
the aforesaid first stage giving rise to a linear polybutadiene ($g_M$=1) with a 1,4-cis unit content greater than 93%, and a $M_w/M_n$ ratio of less than 2.5;
(b) treatment of the polymer solution obtained upon completion of stage (a) with a coupling agent, thus obtaining low branch content polybutadiene having the above mentioned characteristics;
(c) recovery of the low branch content polybutadiene obtained upon completion of stage (b); the aforementioned process being characterised in that the coupling agent is selected from:
(i) unsaturated natural oils;
(ii) butadiene and/or isoprene oligomers;
(iii) butadiene and/or isoprene copolymers with vinylarene monomers;
the unsaturations present in compounds (i)–(iii) being at least partially substituted with groups selected from epoxides, anhydrides and esters.

2. The process according to claim 1, wherein the low branch content polybutadiene has a branch index ($g_M$) of from 0.92 to 0.99.

3. The process according to claim 2, wherein the low branch content polybutadiene has a branch index ($g_M$) of from 0.93 to 0.97.

4. The process according to claim 1, wherein the low branch content polybutadiene has a damping coefficient (tan δ) value of from 0.90 to 1.30.

5. The process according to claim 1, wherein the low branch content polybutadiene has a Mooney viscosity of from 35 to 48, $M_w/M_n$ of from 2.0 to 2.4 and a 1,4-cis unit percentage greater than 94%.

6. The process according to claim 5, wherein the low branch content polybutadiene has a Mooney viscosity of from 35 to 46, $M_w/M_n$ of from 2.1 to 2.2 and a 1,4-cis unit percentage greater than 95%.

7. The process according to claim 1, wherein during stage (a) a linear polybutadiene having a $M_w/M_n$ value of from 2.0 to 2.4 is obtained.

8. The process according to claim 7, wherein the $M_w/M_n$ value ranges from 2.1 to 2.2.

9. The process according to claim 1, wherein the neodymium carboxylates used in stage (a) are selected from the group consisting of neodymium versatate, neodymium pivalate, neodymium 2-ethyl-hexanoate, and mixtures thereof.

10. The process according to claim 1, wherein the temperature of stage (a) varies from 20 to 120° C.

11. The process according to claim 1, wherein during stage (a), the ratio between the (a1) and (a2) components ranges from 1/0.5 to 1/30.

12. The process according to claim 1, wherein during stage (a), the ratio between the (a1) and (a3) components ranges from 1/0.5 to 1/10.

13. The process according to claim 1, wherein during stage (a) the (a1) component is added to the reagent mixture as the final ingredient.

14. The process according to claim 1, wherein the temperature during stage (b) varies from 20 to 150° C.

15. The process according to claim 14, wherein the temperature during stage (b) varies from 70° C. to 120° C.

16. The process according to claim 1, wherein the coupling agent is selected from the group consisting of epoxidised seed oils, epoxidised polybutadienes, maleinised polybutadienes, epoxidised styrene-diene co-polymers, maleinised styrene-diene co-polymers, and mixtures thereof.

17. The process according to claim 1, wherein compounds (i)–(iii) comprise at least 1.5 functional groups per molecule.

18. The process according to claim 17, wherein compounds (i)–(iii) comprise from 3 to 6 functional groups per molecule.

19. The process according to claim 1, wherein the coupling agent used during stage (b) is present in quantities ranging from 0.1 to 0.6 equivalents, with respect to the number of polymer chains present in the system.

20. The process according to claim 19, wherein the coupling agent used during stage (b) is present in quantities ranging from 0.2 to 0.4 equivalents, with respect to the number of polymer chains present in the system.

21. Sulphur-vulcanisable elastomeric mixtures comprising an elastomeric component comprising at least one polybutadiene having a 1,4-cis unit level greater than 93%; the aforementioned at least one polybutadiene comprising the following properties:
a) a polydispersity index of from 2.0 to 2.3;
b) a tan δ value of from 0.8 to 1.40;
c) a $g_M$ value of between 0.92 and 0.99;
d) a Mooney viscosity value of from 35 to 48.

22. The sulphur-vulcanisable elastomeric mixtures according to claim 21, wherein the at least one polybutadiene comprises the following properties:
a) a polydispersity index of from 2.1 to 2.2;
b) a tan δ value of from 0.90 to 1.30;
c) a gm value of from 0.93 to 0.97;
d) a Mooney viscosity value of from 39 to 46.

23. The sulphur-vulcanisable elastomeric mixtures according to claim 21, further comprising carbon black in quantities of from 20 to 350 parts per 100 parts of the elastomeric component.

* * * * *